(12) United States Patent
Robert et al.

(10) Patent No.: US 12,526,446 B2
(45) Date of Patent: Jan. 13, 2026

(54) METHOD AND AN APPARATUS FOR ENCODING OR DECODING A VIDEO

(71) Applicant: InterDigital CE Patent Holdings, SAS, Paris (FR)

(72) Inventors: Antoine Robert, Mezieres sur Couesnon (FR); Ya Chen, Rennes (FR); Fabrice Le Léannec, Betton (FR); Tangi Poirier, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 21 days.

(21) Appl. No.: 18/275,261

(22) PCT Filed: Jan. 26, 2022

(86) PCT No.: PCT/EP2022/051756
§ 371 (c)(1),
(2) Date: Aug. 1, 2023

(87) PCT Pub. No.: WO2022/162004
PCT Pub. Date: Aug. 4, 2022

(65) Prior Publication Data
US 2024/0205449 A1   Jun. 20, 2024

(30) Foreign Application Priority Data
Feb. 1, 2021   (EP) .................................... 21305135

(51) Int. Cl.
*H04N 19/52*   (2014.01)
*H04N 19/176*   (2014.01)

(52) U.S. Cl.
CPC ........... *H04N 19/52* (2014.11); *H04N 19/176* (2014.11)

(58) Field of Classification Search
CPC ............................ H04N 19/52; H04N 19/176
(Continued)

(56) References Cited

U.S. PATENT DOCUMENTS

2020/0221111 A1* 7/2020 Seregin ................ H04N 19/105
2020/0275112 A1* 8/2020 Chiang ................ H04N 19/159
(Continued)

FOREIGN PATENT DOCUMENTS

WO   WO 2020233600 A1   11/2020

OTHER PUBLICATIONS

Seregin et al., "Exploration Experiment on Enhanced Compression beyond VVC Capability", Joint Video Experts Team (JVET) of ITU-T SG 16 WP3 and ISO/IEC JTC 1/SC 29, Document: JVET-U2024-v1, 21st Meeting, by teleconference, Jan. 6, 2021, 13 pages.
(Continued)

*Primary Examiner* — Albert Kir
(74) *Attorney, Agent, or Firm* — Condo Roccia Koptiw LLP

(57) ABSTRACT

A method for coding or decoding a block is provided, as well as a corresponding apparatus. A prediction for the block is determined, wherein motion information that is used for determining the prediction is inherited from motion information of at least two motion candidates, and the block is coded or decoded based on the determined prediction, wherein determining the prediction for the block comprises determining a value for an indicator enabling or disabling correction of the prediction, based on values of corresponding indicators of the at least two motion candidates.

20 Claims, 9 Drawing Sheets

(58) Field of Classification Search
USPC .................................................. 375/240.16
See application file for complete search history.

(56) References Cited

U.S. PATENT DOCUMENTS

| | | | |
|---|---|---|---|
| 2021/0076029 A1* | 3/2021 | Han | H04N 19/107 |
| 2021/0235073 A1* | 7/2021 | Liu | H04N 19/86 |
| 2021/0235110 A1* | 7/2021 | Liu | H04N 19/52 |

OTHER PUBLICATIONS

Liu et al., "Local Illumination Compensation", ITU—Telecommunication Standarization Sector, Study Group 16, Question 6, Video Coding Experts Group (VCEG), Document VCEG-AZ06, 52nd Meeting, Warsaw, Poland, Jun. 19, 2015, 4 pages.

Chang et al., "Compression efficiency methods beyond VVC", Joint Video Experts Team (JVET) of ITU-T SG 16 WP 3 and ISO/IEC JTC 1/SC 29, Document: JVET-U0100, 21st Meeting, by teleconference, Jan. 6, 2021, 13 pages.

Robert et al., "Non-CE4 : BCW inheritance for pairwise", Joint Video Experts Team (JVET) of ITU-T SG 16 WP 3 and ISO/IEC JTC 1/SC 29/WG 11, Document: JVET-O0516, 15th Meeting, Gothenburg, Sweden, Jul. 3, 2019, 7 pages.

Chen et al., "Algorithm description for Versatile Video Coding and Test Model 8 (VTM 8)", Joint Video Experts Team (JVET) of ITU-T SG 16 WP 3 and ISO/IEC JTC 1/SC 29/WG 11, Document JVET-Q2002-v3, 17th Meeting, Brussels, Belgium, Jan. 7, 2020, 97 pages.

Li et al., "Non-CE4: On LIC for Affine", Joint Video Experts Team (JVET) of ITU-T SG 16 WP 3 and ISO/IEC JTC 1/SC 29/WG 11, Document: JVET-O0531, 15th Meeting, Gothenburg, Sweden, Jul. 3, 2019, 5 pages.

* cited by examiner (a) 4 Parameter Affine Model    (b) 4 Parameter Affine Model

METHOD AND AN APPARATUS FOR ENCODING OR DECODING A VIDEO

CROSS REFERENCE TO RELATED APPLICATIONS

This application is a U.S. National Stage Application under 35 U.S.C. §371 of International Patent Application No. PCT/EP2022/051756, filed Jan. 26, 2022, which is incorporated herein by reference in its entirety.

This application claims priority to European Application No. 21305135.2, filed Feb. 1, 2021, which is incorporated herein by reference in its entirety.

TECHNICAL FIELD

The present embodiments generally relate to a method and an apparatus for motion information derivation in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

A method for coding a video block is provided. The method for coding a video block comprises determining a prediction for the block, wherein motion information that is used for determining the prediction is inherited from motion information of at least two motion candidates, and coding the block based on the determined prediction, wherein determining the prediction for the block comprises determining a value for an indicator enabling or disabling correction of the prediction, based on values of corresponding indicators of the at least two motion candidates.

According to another embodiment, an apparatus for coding a video block is provided, that comprises one or more processor, configured to determine a prediction for the block, wherein motion information that is used for determining the prediction is inherited from motion information of at least two motion candidates, and code the block based on the determined prediction, wherein determining the prediction for the block comprises determining a value for an indicator enabling or disabling correction of the prediction, based on values of corresponding indicators of the at least two motion candidates.

According to another embodiment, a method for decoding a video block is provided, wherein the method comprises determining a prediction for the block, wherein motion information that is used for determining the prediction is inherited from motion information of at least two motion candidates, and decoding the block based on the determined prediction, wherein determining the prediction for the block comprises determining a value for an indicator enabling or disabling correction of the prediction, based on values of corresponding indicators of the at least two motion candidates.

According to another embodiment, an apparatus for decoding a video block is provided, that comprises one or more processors configured to determine a prediction for the block, wherein motion information that is used for determining the prediction is inherited from motion information of at least two motion candidates, and decode the block based on the determined prediction, wherein determining the prediction for the block comprises determining a value for an indicator enabling or disabling correction of the prediction, based on values of corresponding indicators of the at least two motion candidates.

One or more embodiments also provide a computer program comprising instructions which when executed by one or more processors cause the one or more processors to perform the encoding method or decoding method according to any one of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
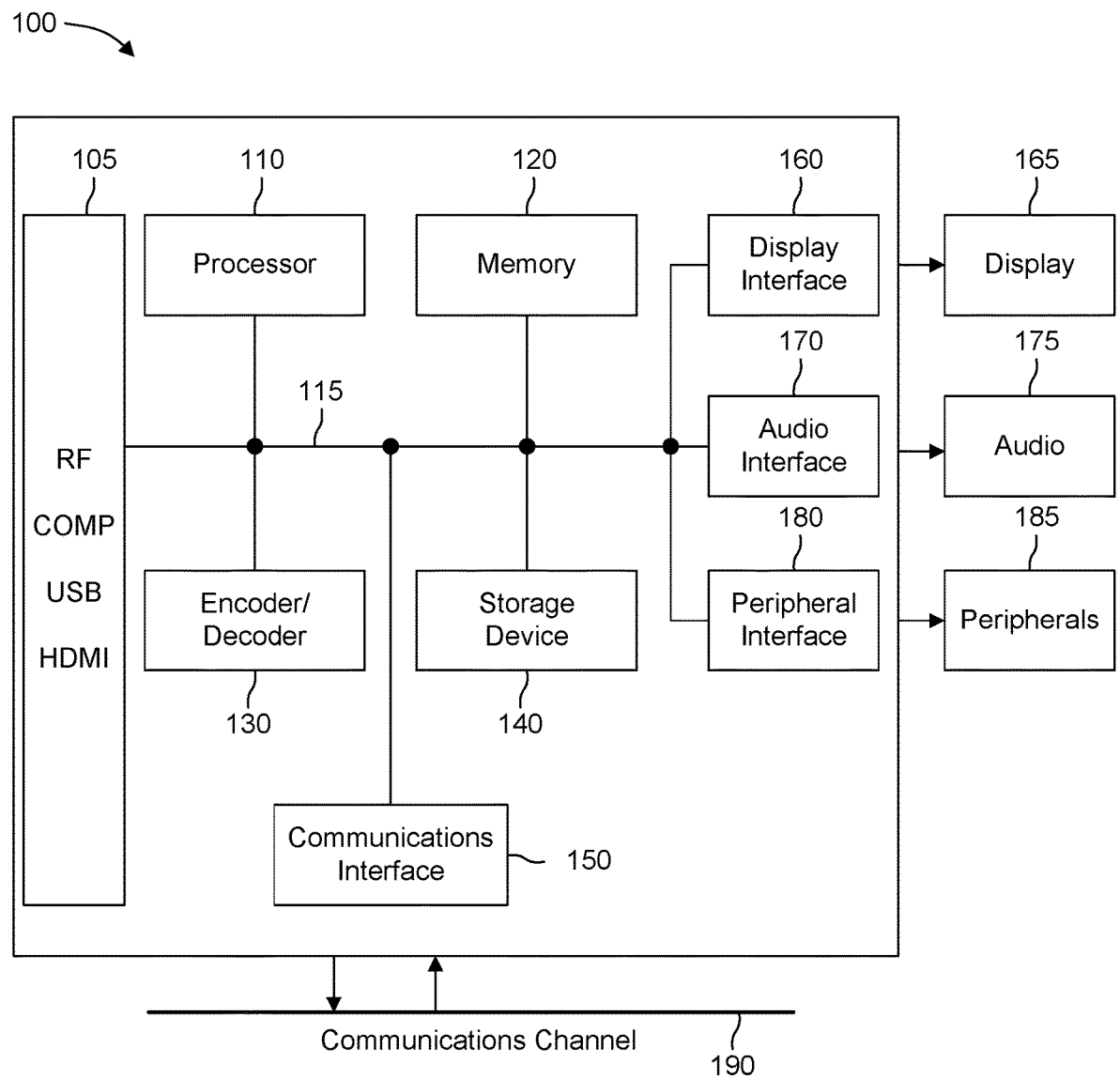
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal 20) transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
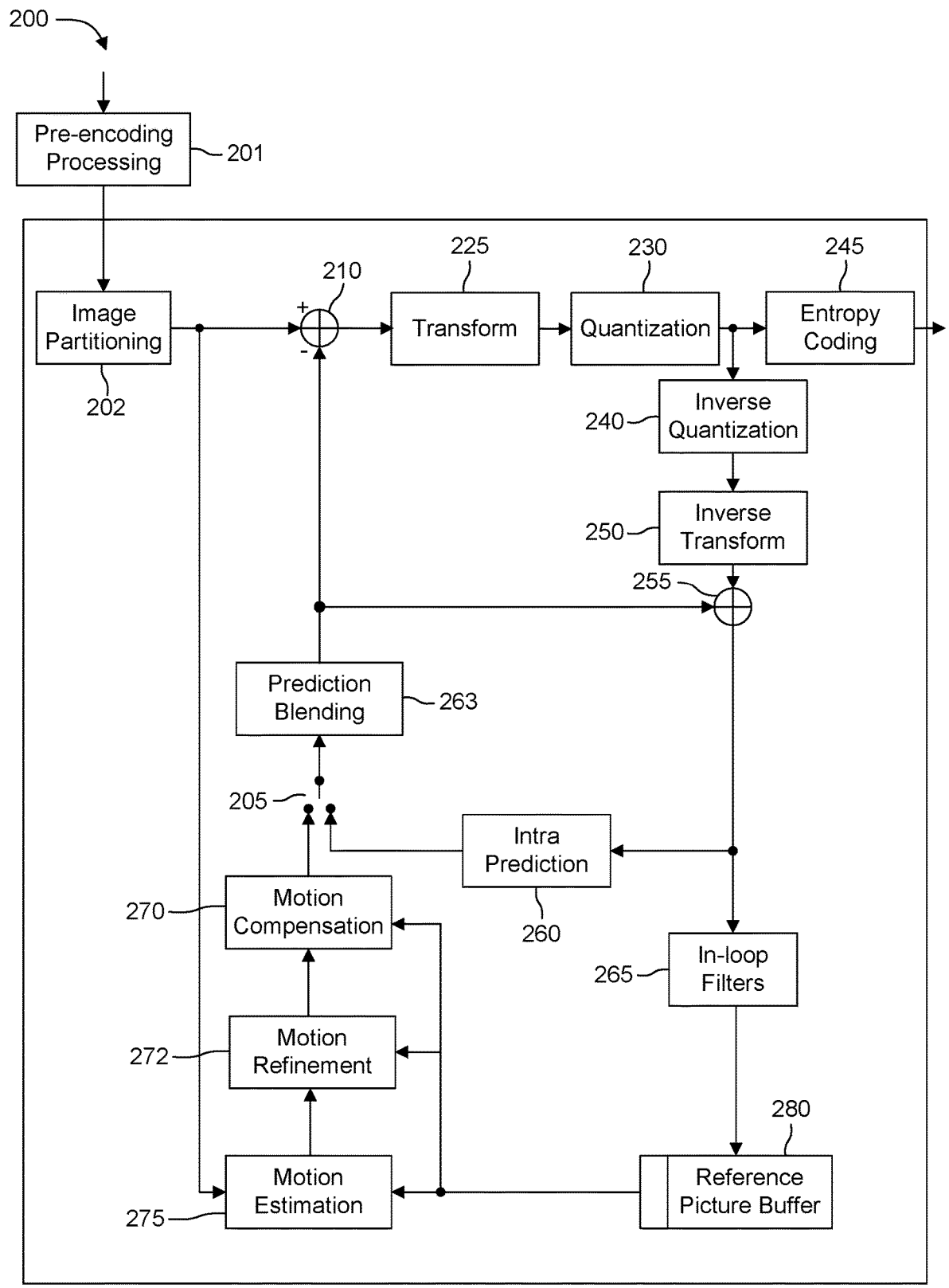
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team), or any video encoder.

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. According to an embodiment, a unit may be partitioned into sub-units.

Each unit or sub-unit is encoded using, for example, either an intra or inter mode. When a unit is encoded in an intra mode, it performs intra prediction (260). Intra prediction uses pixels of already coded neighboring blocks (which are called reference samples) in the same video picture/slice of the block to predict the current video block. Spatial prediction reduces spatial redundancy inherent in the video signal.

In an inter mode, inter prediction is performed with motion estimation (275) and compensation (270). Inter prediction, also referred to temporal prediction, uses reconstructed pixels from the already coded video pictures to predict a current video block. Inter prediction reduces temporal redundancy inherent in the video signal.

For each inter-predicted CU, motion information is used for generating the inter-prediction for the current block. The motion information can comprise one or more motion vectors which indicate the amount and the direction of motion between the current block and its reference block, one or more reference picture index which identifies in a reference picture list, the reference picture from which the reference block comes. Motion information may comprise additional information needed for specific coding feature of the encoder/decoder, such as a LIC indicator indicating if a LIC tool is enabled or disabled for the current block.

Depending on embodiments described further below, different inter-prediction modes can be used for generating the prediction for the current block. Any of the inter-prediction modes can be implemented alone or in combination with any one of the other inter-prediction modes. An inter-prediction mode is selected among the available inter-prediction modes, for instance based on a Rate/Distortion cost, and the selected inter-prediction mode is signaled in the bitstream.

The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods.

Prediction residuals are calculated, for example, by subtracting (210) the predicted block from the original image block. The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
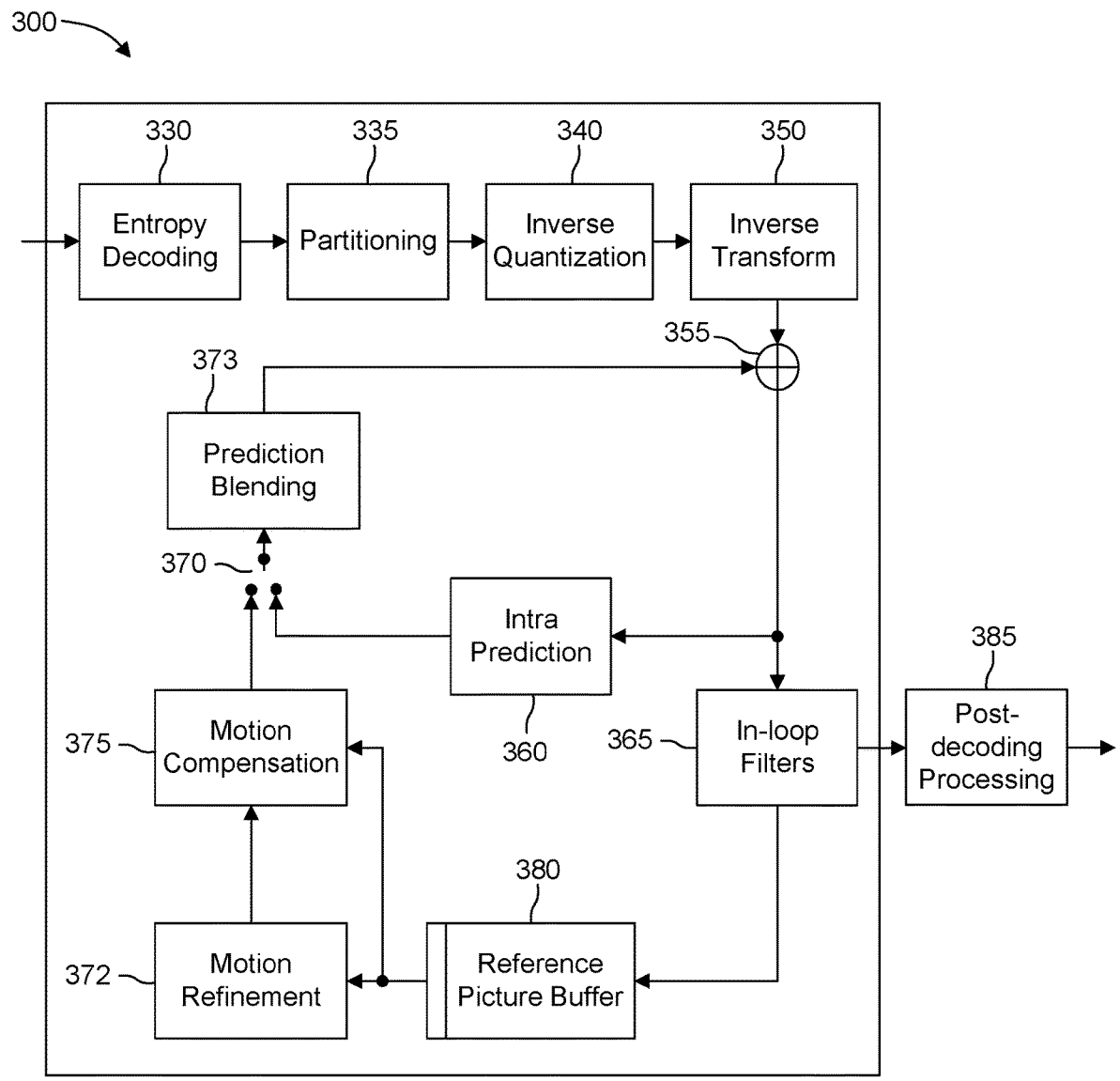
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

For easier reference, the terms "CU" and "block" are used interchangeably throughout the text.

According to an embodiment, in the encoder and decoder described above, motion information for inter-prediction modes can be signaled in an explicit or implicit manner. For instance, in a coding mode, also called merge mode, motion information is inherited from a motion candidate, e.g. an already coded neighboring CU of the current block including spatial and temporal candidates and additional motion candidates depending on the encoder/decoder implementation. The merge mode can be applied to any-inter-predicted CU.

A motion candidate is a coded block or CU that can be used for predicting a block or CU in an inter-prediction mode.

According to an embodiment, in the merge mode, a motion candidate list is constructed by including one or more motion candidates. The prediction obtained respectively by using motion information of the motion candidates in the list is evaluated and a motion candidate that provides a lowest rate/distortion cost for the block is selected. An index identifying the selected motion candidate is then coded in the bitstream for the current block.

According to an embodiment, the motion candidate list can be populated with any one of the following types of motion candidates, in an order:
1) spatial motion vector predictors from spatial neighbor CUS,
2) temporal motion vector predictors from collocated CUs,
3) history-based motion vector predictors from a first-in-first-out table,
4) pairwise average motion vector predictors,
5) zero motion vectors.

Motion candidates are included in the list according to the order, until a maximum allowed size is reached for the list. The motion candidate list described above is an example, any other motion candidates derived according to a specific feature of the encoder/decoder can be included at any location in the list. Also, the list may be constructed without considering one or more of the motion candidates described above. Furthermore, the order given above for considering the motion candidates is an example, any other order can be used. It is thus to be understood that the motion candidate list can be populated using any derivation process for the motion candidates as long as a same list construction process is used at the encoder and the decoder.

Figure 5:
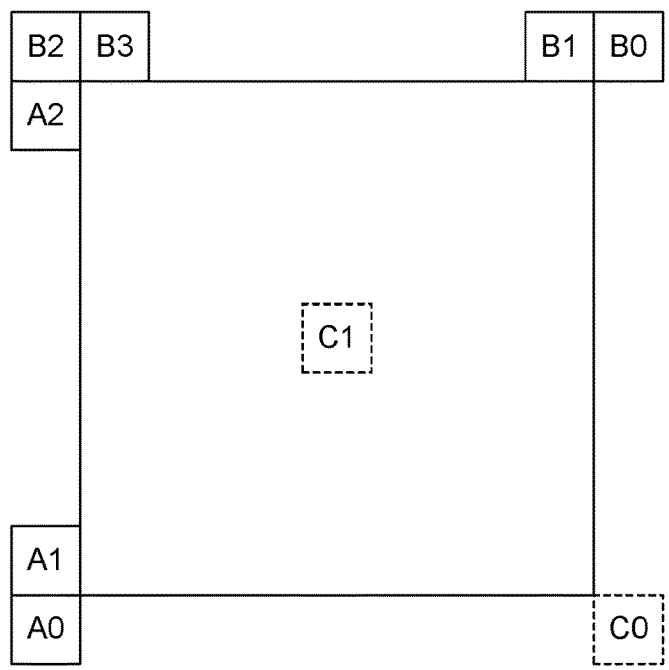
FIG. 5 illustrates an example of spatial and temporal neighboring positions used for deriving motion vector predictors for a motion candidate list, according to an embodiment.

FIG. 5 illustrates an example of the spatial and temporal neighboring positions used for deriving motion vector predictors for the motion candidate list. The spatial neighbor can comprise a top CU (B1), a left CU (A1), a top-right CU (B0), a bottom-left CU (A0) and a top-left CU (B2) if less than 4 spatial motion candidates have been added to the list. A redundancy check can be applied before adding a new motion vector predictor to ensure that candidates with same motion information are excluded from the list.

Temporal neighbor can comprise a bottom-right CU (C0) in a collocated picture or a center CU C1 if C0 is not available. History-based motion candidates are obtained from a table storing motion information of previously coded blocks which is maintained during the encoding/decoding process. The table stored a fixed number of motion information, and is managed using a first-in-first-out process.

According to an embodiment, pairwise average candidates are generated by averaging predefined pairs of candidates. For instance, the predefined pairs of candidates can be motion candidates included in the merge candidate list. According to another variant, the predefined pairs of candidates can be any other motion candidates. The derivation of the predefined pairs of candidates has thus to be performed in a same way at the encoder and the decoder.

According to an example, predefined pairs of candidates can be defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even if they point to different reference pictures; if only one motion vector is available, then this motion vector is added to the list.

According to an embodiment, when the merge candidate list is not full after pair-wise average merge candidates are added, zero MVPs (motion vector predictor) are inserted in the end until the maximum merge candidate number is reached.

According to an embodiment, the motion candidate list can be used for any other inter-prediction mode wherein motion information has to be derived from a motion candidate. Examples of such mode are merge mode with MVD wherein motion vector difference (MVD) is coded in the bitstream for the CU, a combined inter and intra prediction (known as CIIP in the VVC standard), a geometric partitioning mode, or an affine mode using an affine motion model, a spatio-temporal motion vector predictor (STMVP) averaging two spatial motion candidates and one temporal candidate.

An alternative inter-prediction mode to the merge mode for inter-predicting a current CU may be a coding mode wherein motion information is explicitly transmitted/coded in the bitstream for the CU.

Figure 6:
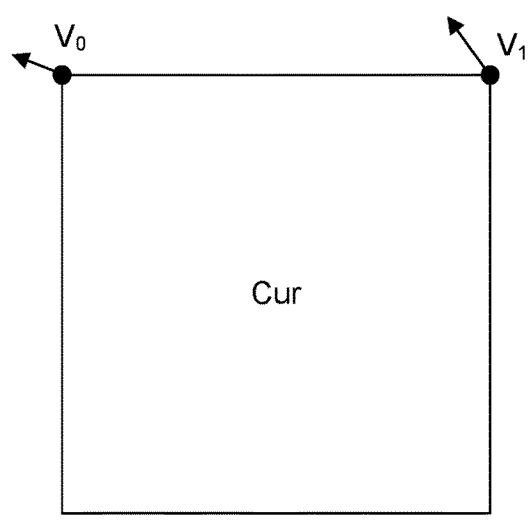
FIG. 6 illustrates a control point based affine motion model, according to an embodiment.
Figure 6:
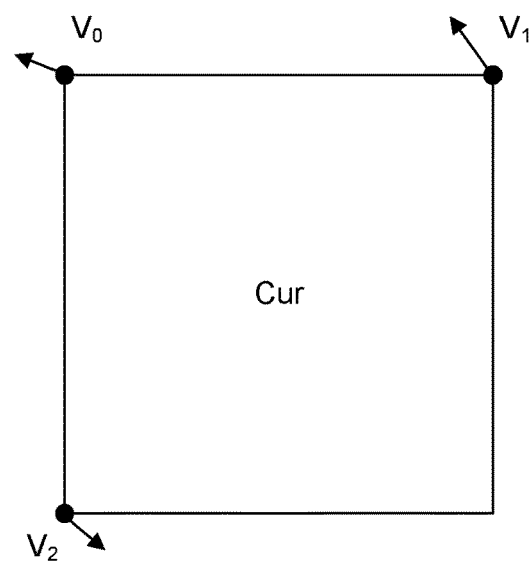

According to an embodiment, inter-prediction can include affine coding mode wherein block-based affine transform motion compensation prediction is applied. As shown in FIG. 6, an affine motion field of the block may be described by motion information of two control point motion vectors (CPMV) (4-parameter) or three control point motion vectors (6-parameter).

For a 4-parameter affine motion model, motion vector at sample location (x, y) in a block may be derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases}$$

For a 6-parameter affine motion model, motion vector at sample location (x, y) in a block may be derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}$$

where $(mv_{0x}, mv_{0y})$ is the motion vector of the top-left corner control point determined for the CU, $(mv_{1x}, mv_{1y})$ is the motion vector of the top-right corner control point determined for the CU, and $(mv_{2x}, mv_{2y})$ is the motion vector of the bottom-left corner control point determined for the CU.

According to an embodiment, the CPMVs of the current CU can be generated based on motion information of spatial neighboring CUs. A fixed number of CPMVP candidates are derived and an index is signalled to indicate the one to be used for the current CU. In an example, up to five motion candidates can be used. According to a variant, the following three types of CPVMP candidate may be used to form an affine merge candidate list:

Spatial inherited affine candidates,
Constructed affine candidates CPMVPs,
Zero CPMVs.

The spatial inherited affine candidates can be derived from affine motion model of the neighboring blocks, for instance one from left neighboring CUs and one from above neighboring CUs. An example is illustrated in FIG. 5. For the left predictor, a scan order for selecting a left predictor can be A1, A0, and for the above predictor, a scan order can be B1, B0, B2. Only the first inherited candidate from each side is selected.

Figure 7:
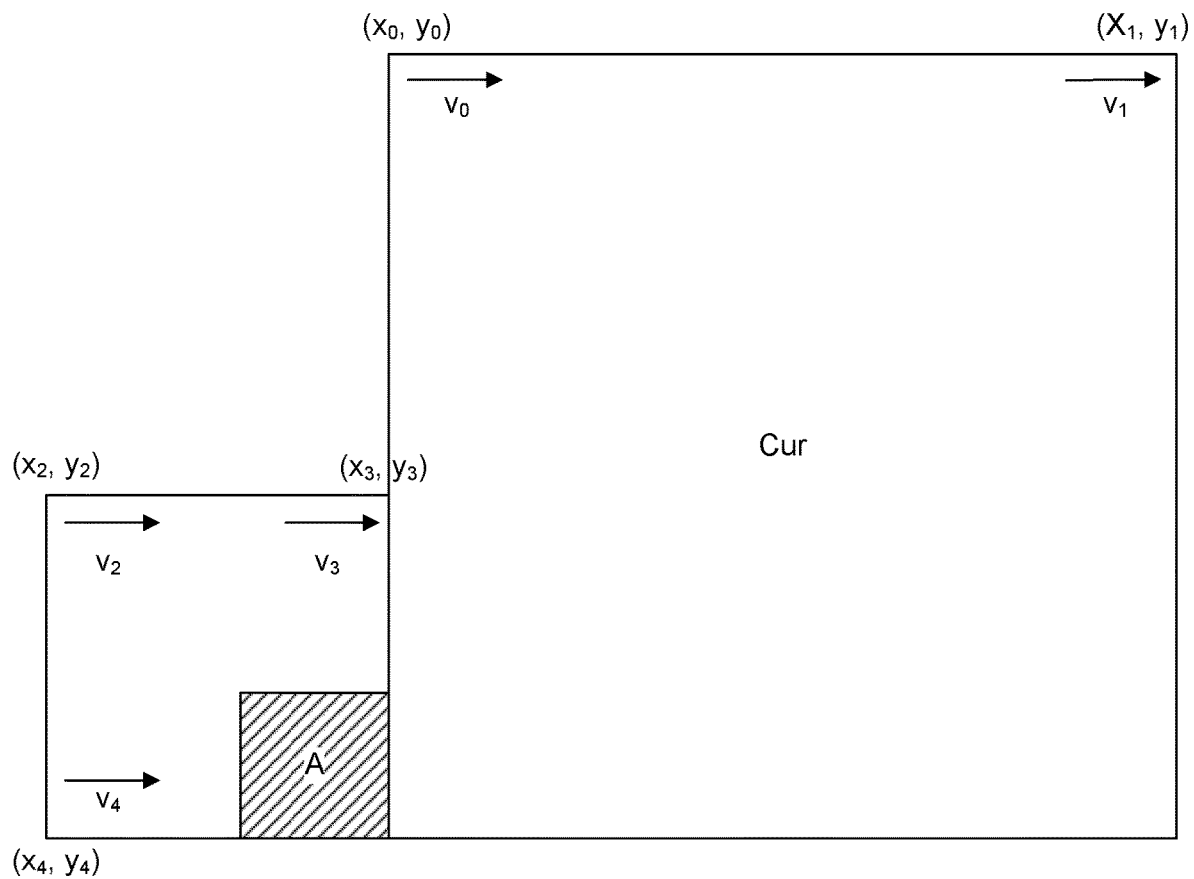
FIG. 7 illustrates an example of control point motion vector inheritance.

When a neighboring affine CU is identified, its control point motion vectors are used to derive the CPMVP candidates in the affine merge list of the current CU. As shown in FIG. 7, if the neighbour left bottom block A is coded using an affine model, the motion vectors $v_2$, $v_3$ and $v_4$ of the top left corner, above right corner and left bottom corner of the CU which contains the block A are attained. When the block A is coded with a 4-parameter affine model, the two CPMVs of the current CU (Cur in FIG. 7) are calculated according to $v_2$ and $v_3$. When the block A is coded with a 6-parameter affine model, the three CPMVs of the current CU are calculated according to $v_2$, $v_3$ and $v_4$.

Constructed affine candidates are constructed by combining the neighbor translational motion information of each control point of the CU. The motion information for the control points may be derived from the specified spatial neighbors and temporal neighbor as shown in FIG. 5. $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For $CPMV_4$, the temporal motion vector predictor (TMVP) C0 is used if it is available.

The constructed affine motion candidates are then constructed based on motion of the MVs of the four above control points $CPMV_k$ (k=1, 2, 3, 4). The following combinations of control point MVs may be used to construct in a specific order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs can be discarded.

After inherited affine merge candidates and constructed affine merge candidate are checked, if the motion candidate list is still not full, zero CPMVs may be inserted to the end of the list.

According to an embodiment, the motion information in the affine coding mode can be implicitly signaled, using for instance a process similar to the merge mode, or explicitly signaled. When motion information is implicitly signaled in the affine coding mode, also referred as affine merge mode, motion information of each of the CPMV is inherited from a motion candidate determined as described above. An index is coded for the CU to indicate the motion candidate used for the CU.

According to an embodiment, inter-prediction can include geometric partition inter-prediction mode wherein a CU is split into two partitions by a splitting edge defined with an angle and a distance. The geometric partition allows a better alignment of inter prediction boundary with objects. According to an embodiment, a geometric inter-prediction mode can have 32 angles and 5 distances. When the geometric inter-prediction mode is used, the CU is split into two non-rectangular partitions. Each partition in the CU is inter-predicted using its own motion parameters. According to a variant, only unidirectional prediction is allowed.

Motion information for each partition of the geometric mode is derived from a motion candidate list. For instance, the motion candidate list described above can be used. Each partition has one motion vector and one reference index. After predicting each of the partitions, the sample values along the splitting edge may be adjusted using a blending process with adaptive weights.

Figure 8:
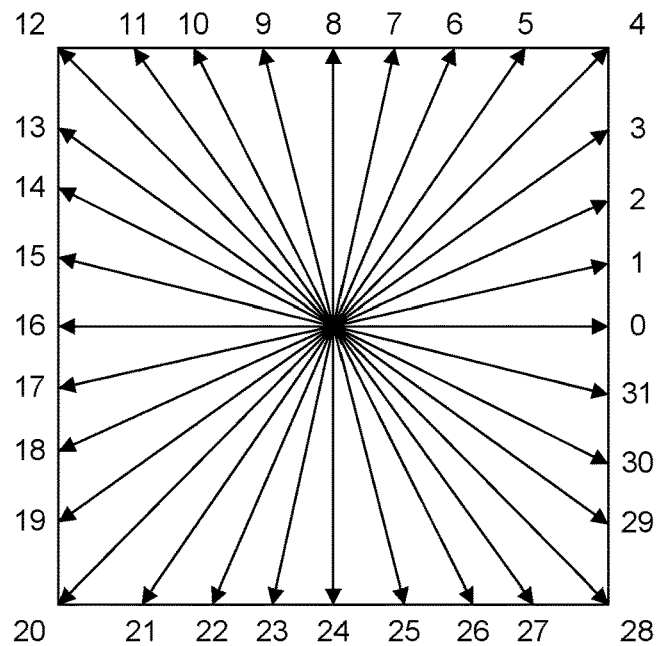
FIG. 8 illustrates an example of angles in a geometric inter-prediction mode according to an embodiment.

The split boundary can be described by angle $\varphi_i$ and distance offset $\rho_i$. The angle $\varphi_i$ can be quantized from 0 degree to 360 degrees with a step equal to 11.25 degrees. FIG. 8 illustrates an example of 32 angles that can be used in the geometric inter-prediction mode.

Figure 9:
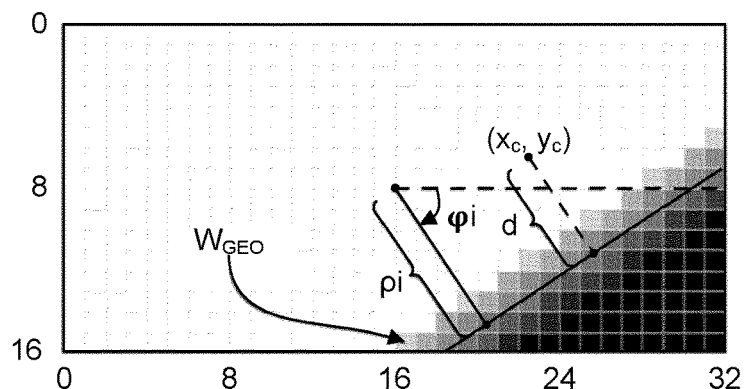
FIG. 9 illustrates an example of a geometric split description.
Figure 10:
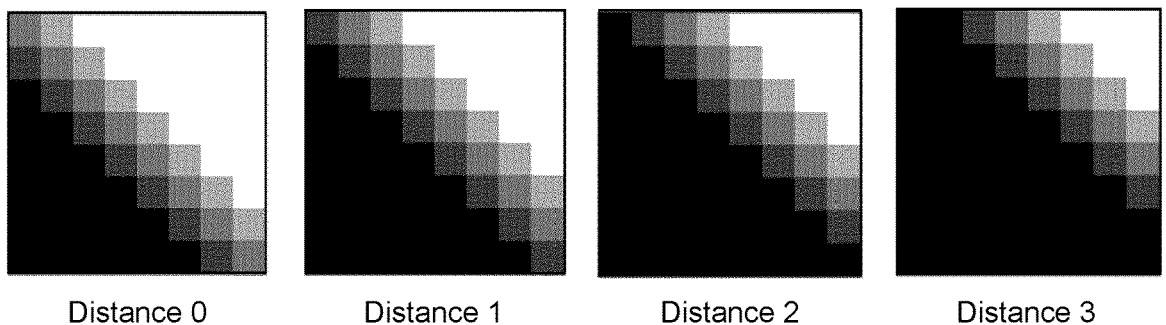
FIG. 10 illustrates an example of a geometric partition with angle 12 and distance between 0 to 3.

The description of a geometric split with angle $\varphi_i$ and distance $\rho_i$ is illustrated in FIG. 9. Distance $\rho_i$ can be quantized from a largest possible distance $\rho_{max}$ with a fixed step, which indicates a distance from the center of the block. According to a variant, for distance $\rho_i=0$, only the first half of the angles are available as splits are symmetric in this case. Some results of geometric partitioning using angle 12 and distance between 0 and 3 are depicted in FIG. 10.

According to an embodiment, the motion information in the geometric inter-prediction mode can be implicitly signaled, using for instance a process similar to the merge mode, or explicitly signaled. When motion information is implicitly signalled, also referred as geometric merge mode, motion information of each partition is inherited from a motion candidate of the motion candidate list. An index is coded for each partition of the CU to indicate the motion candidate used for the partition.

In temporal prediction process, local illumination compensation (LIC) is a coding tool which is used to address the issue of local illumination changes that may exist between temporal neighboring pictures. The LIC tool is based on a linear model where at least one of a scaling factor $\alpha$ and an offset $\beta$ are applied to the reference samples to obtain the prediction samples of a current block. In this way, the LIC parameters allows to correct the prediction obtained for the current block. Specifically, the LIC tool can be mathematically modelled by the following equation:

$$P(x, y) = \alpha \cdot P_r(x + v_x, y + v_y) + \beta$$

where $P(x, y)$ is the prediction signal of the current block at the coordinate $(x, y)$; $P_r(x+v_x, y+v_y)$ is the reference block pointed by the motion vector $(v_x, v_y)$; $\alpha$ and $\beta$ are the corresponding scaling factor and offset that are applied to the reference block.

Figure 4:
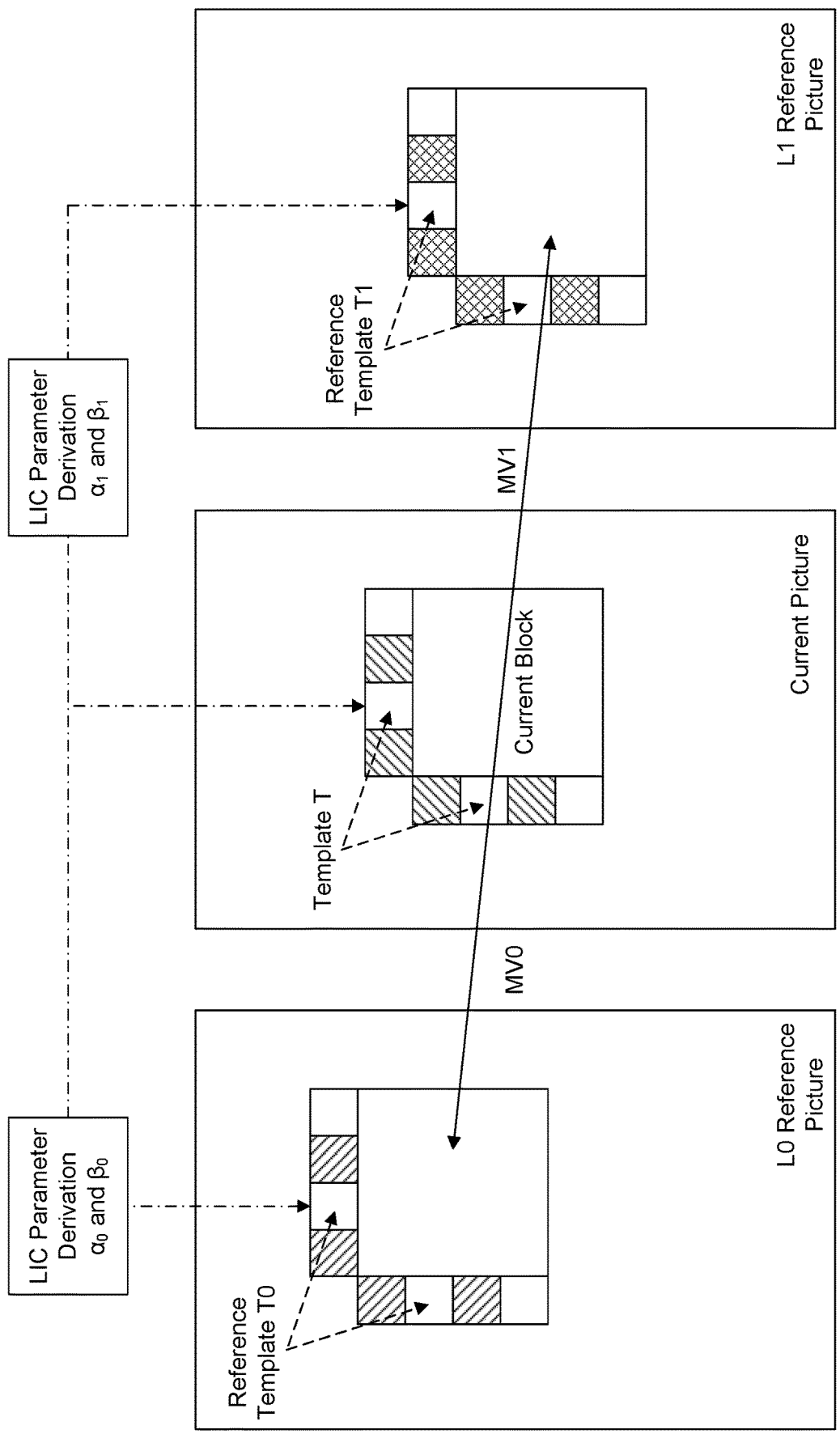
FIG. 4 illustrates an example of a method for LIC parameters derivation, according to an embodiment.

FIG. 4 illustrates a method for determining LIC parameters according to an embodiment. In FIG. 4, when the LIC is applied for a block, a least mean square error (LMSE) method is employed to derive the values of the LIC parameters (i.e., $\alpha$ and $\beta$) by minimizing a difference between the neighboring samples of the current block (i.e., the template T in FIG. 4) and their corresponding reference samples ($T_0$ or $T_1$) in the temporal reference pictures L0 reference picture and L1 reference picture, as shown in FIG. 4:

$$\alpha_{0/1} = \frac{N \cdot \sum_{i}^{N}(T(x_i, y_i) \cdot T_{0/1}(x_i + v_x^{0/1}, y_i + v_y^{0/1})) - \sum_{i=1}^{N}(T(x_i, y_i)) \cdot \sum_{i=1}^{N}(T_{0/1}(x_i + v_x^{0/1}, y_i + v_y^{0/1}))}{N \cdot \sum_{i=1}^{N}(T(x_i, y_i) \cdot T_{0/1}(x_i + v_x^{0/1}, y_i + v_y^{0/1})) - (\sum_{i=1}^{N} T_{0/1}(x_i + v_x^{0/1}, y_i + v_y^{0/1}))^2}$$

$$\beta = \frac{\sum_{i=1}^{N}(T(x_i, y_i)) - \alpha_{0,1} \cdot \sum_{i=1}^{N}(T_{0/1}(x_i + v_x^{0/1}, y_i + v_y^{0/1}))}{N}$$

where N represents the number of template samples that are used for deriving the LIC parameters; $T(x_i, y_i)$ is the template sample of the current block at the coordinate $(x_i, y_i)$; $T_{0/1}(x_i+v_x^{0/1}, y_i+v_y^{0/1})$ is the corresponding reference sample of the template sample based on the motion vector $(v_x^{0/1}, v_y^{0/1})$ (subscript 0 being for L0 reference picture, subscript 1 being for L1 reference picture) of the current block. According to a variant, to reduce the computational complexity, both the template samples and the reference template samples are subsampled (2:1 subsampling) to derive the LIC parameters, i.e., only the shaded samples of the template in FIG. 4 are used to derive $\alpha$ and $\beta$.

Moreover, when LIC is applied to bi-directional blocks (i.e., being predicted by two temporal prediction blocks), the LIC parameters are derived and applied for each prediction direction, i.e., L0 and L1, separately. As shown in FIG. 4, based on the two motion vectors MV0 and MV1, two reference templates T0 and T1 can be obtained; by separately minimizing the distortions between T0 and T, and T1 and T, the corresponding pairs of LIC parameters in the two directions can be derived according to the equations given above.

Afterwards, a final bi-directional prediction signal of the current block is generated by combining two LIC uni-prediction blocks, as indicated as:

$$P(x, y) = \frac{1}{2} \cdot (\alpha_0 \cdot P_r^0(x + v_x^0, y + v_y^0) + \beta_0 + \alpha_1 \cdot P_r^1(x + v_x^1, y + v_y^1) + \beta_1)$$

where $\alpha_0$ and $\beta_0$ and $\alpha_1$ and $\beta_1$ are the LIC parameters respectively associated with the motion vectors MV0 and MV1 (i.e., $(v_x^0, v_y^0)$ and $(v_x^1, v_y^1)$ of the current block; $P_r^0(x+v_x^0,y+v_y^0)$ and $P_r^1(x+v_x^1,y+v_y^1)$ are the corresponding temporal reference blocks of the current block obtained from the reference picture in the reference picture list L0 and L1, respectively.

The LIC tool described above may be used in an encoding/decoding video scheme as described above in relation with FIG. 1-3.

When motion information for predicting a CU is inherited from a motion candidate, a LIC indicator is included in the motion information inherited from the motion candidate in addition to the motion vector and reference index.

However, when motion information is determined for a CU based on combined motion information, LIC indicator cannot be directly inherited by the CU. Combined motion information occurs when the CU inherits motion information from at least two motion candidates. For example, in a merge mode, the pairwise motion candidate uses at least two motion candidates for deriving motion information. In another example, in a geometric merge mode, each partition has its own motion candidate. In yet another example, in an affine merge mode, each constructed CPMV has its own motion candidate. These examples are not limitative, and other inter-prediction modes may yield the use of more than one motion candidate for inheriting motion information for the CU.

The LIC indicator indicating whether LIC tool is used for the CU is coded at the CU level. That is when more than one motion candidate is used for motion information inheritance, more than one indicator is inherited by the CU. When the inherited indicators have different values, this brings an ambiguity on whether the tool is enabled or disabled for the CU. Therefore, there is a need to improve the situation.

The principles are described here in the case of the LIC feature, but the present principles can be applied to any feature that can be inherited from a motion candidate, that is signaled once for a CU.

In the following, it is referred to an indicator associated to a motion candidate. As discussed above, the indicator may be a LIC indicator or any indicator inherited from a motion candidate. Such an indicator may be a flag that can take a Boolean value. The indicator may also be a non-boolean value, for instance an indicator indicating as status of a tool, such as enabled or disabled or any state in-between (enabled with specific parameters/weights, . . . ).

Figure 11:
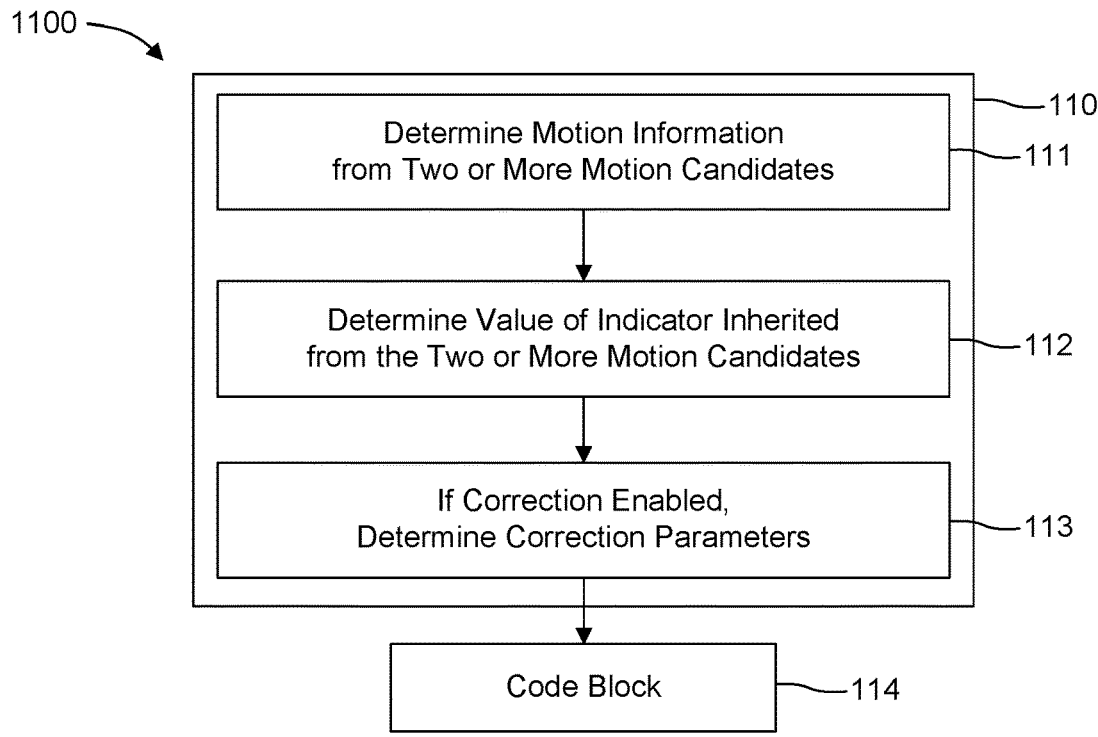
FIG. 11 illustrates an example of a method for coding a block in a video, according to an embodiment.

FIG. 11 illustrates an example of a method 1100 for coding a block in a video, according to an embodiment. According to an embodiment, the method 1100 may be implemented in the encoder described with FIG. 2.

At 110, a prediction is determined for the block. Several coding modes may be evaluated for determining a best coding mode for the block in a rate/distortion sense. Among these coding modes, at least one of the coding modes uses motion information which is inherited from motion information of at least two motion candidates.

For such a coding mode, at 111, motion information including motion vectors and reference frame index, is determined for the block from the two or more motion candidates. The prediction, i.e. the predicted block, is then computed from the derived motion vectors and the reference frame index using motion compensation of the reference picture.

At 112, a value of an indicator that enables or disables correction of the prediction is determined based on the values of corresponding indicators of the at least two motion candidates. The indicator may be for instance an indicator of a LIC tool described above.

At 113, it is determined, based on the indicator set at 112 for the block, whether correction of the prediction is enabled or disabled. If correction of the prediction is enabled, correction parameters are determined, for instance based on rate/distortion cost determined on templates neighboring the block to code as described in relation with FIG. 4. The prediction is then corrected using the determined parameters.

At 114, the block is coded based on the determined prediction. Depending on the rate/distortion cost, the block may be coded using the inter-prediction mode for which the prediction has been determined at 110 or using another coding mode yielding a lower rate/distortion cost.

Figure 12:
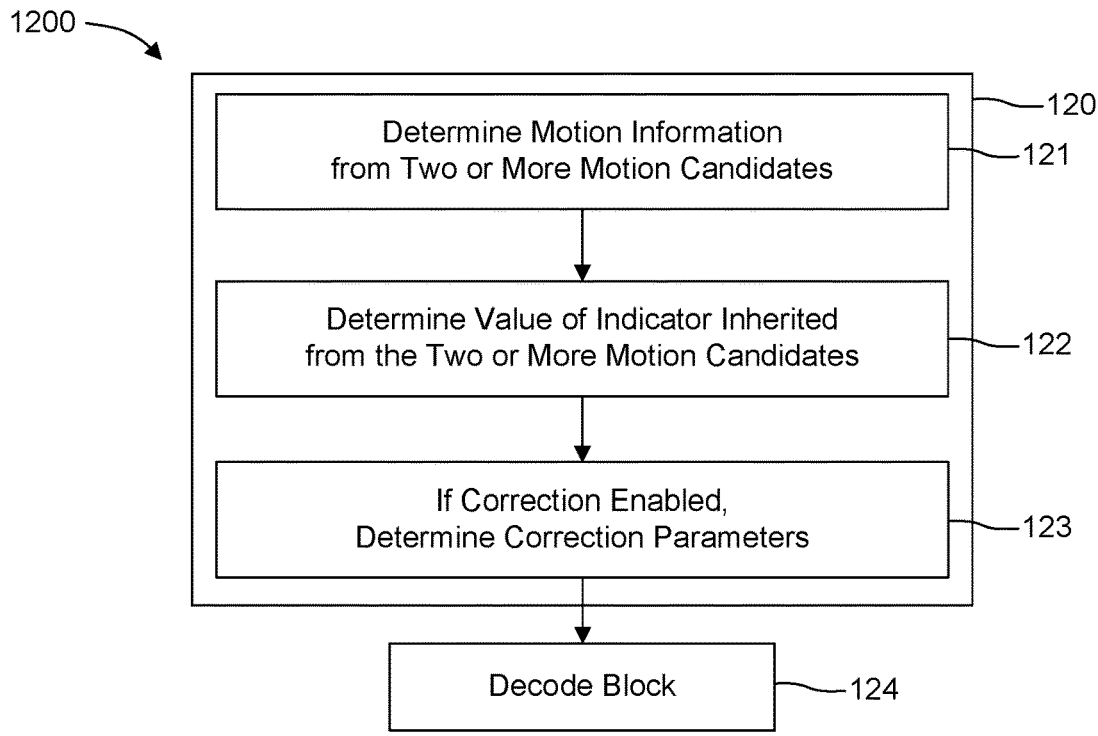
FIG. 12 illustrates an example of a method for decoding a block in a video, according to an embodiment.

FIG. 12 illustrates an example of a method 1200 for decoding a block in a video, according to an embodiment. According to an embodiment, the method 1200 may be implemented in the decoder described with FIG. 3.

At 120, a prediction is determined for the block. For determining the prediction for the block, at least one coding parameter representative of a coding mode is decoded from a bitstream for the block. According to an embodiment, the coding mode used to encode the block uses motion information of at least one motion candidate that inherits motion information of at least two motion candidates.

At 121, motion information including motion vectors and reference frame index, is determined for the block from the two or more motion candidates. The prediction, i.e. the predicted block, is then computed from the derived motion vectors and the reference frame index using motion compensation of the reference picture.

At 122, a value of an indicator that enables or disables correction of the prediction is determined based on the values of corresponding indicators of the at least two motion candidates. The indicator may be for instance an indicator of a LIC tool described above.

At 123, it is determined, based on the indicator set at 122 for the block, whether correction of the prediction is enabled or disabled. If correction of the prediction is enabled, correction parameters are determined, for instance based on rate/distortion cost determined on templates neighboring the block to decode as described in relation with FIG. 4. The prediction is then corrected using the determined parameters.

At 124, the block is decoded and reconstructed based on the determined prediction.

At 112 or 122, different variants may be uses for determining the value of the indicator for the block.

According to a variant, for determining a value for the indicator, the value of the indicator is based on an importance of at least one of the at least two motion candidates.

According to another variant, when the indicator can be represented as a boolean value, for determining a value for the indicator, the value of the indicator is obtained from an OR or an AND operation performed on the value of the indicators of the at least two motion candidates.

According to another variant, if the value of the indicator for all the at least two motion candidates indicates that correction of the prediction is enabled, the value of the indicator is set to a value indicating that correction of the prediction is enabled.

According to another variant, if the value of the indicator for at least one of the at least two motion candidates indicates that correction of the prediction is enabled, the value of the indicator is set to a value indicating that correction of the prediction is enabled.

LIC Indicator Inheritance for Pairwise Motion Candidates

According to an embodiment, the coding mode that uses motion information at least two motion candidates is a merge mode as described above. According to this embodiment, the motion candidates list comprises a pairwise motion candidate. The pairwise candidate is constructed as the average of two motion candidates already present in the motion candidates list. For instance, in the VVC standard, the two motion candidates used are the 2 first ones. For each reference frame list:

If both motion candidates have a motion vector associated with a reference frame
The pairwise motion candidate gets the average motion vector with the reference frame of the first motion candidate, Otherwise
  If only one motion candidate has a motion vector associated with a reference frame
    The pairwise motion candidate gets the motion vector and the reference frame of this motion candidate,
  Otherwise
    The pairwise motion candidate is undefined for this reference frame list.

According to a variant, the pairwise motion candidate can inherit a LIC indicator of the input motion candidates if both these motion candidates hold a same value of LIC indicators, meaning that the pairwise motion candidate inherits this common LIC indicator, otherwise the LIC indicator is set to false. This variant may be performed as an "and" operation between the LIC indicators of the input motion candidates as $LIC_{pairwise}=LIC_{cand0}$ and $LIC_{cand1}$, where $LIC_{pairwise}$, $LIC_{cand0}$, $LIC_{cand1}$ stands respectively for the LIC indicator of the pairwise motion candidate, the first motion candidate and the second motion candidate.

According to another variant, if one of the input motion candidates has a LIC value equal to true, then the pairwise motion candidate can inherit from this LIC value. This variant may be performed as an "or" operation between the LIC indicator values of the input motion candidates as $LIC_{pairwise}=LIC_{cand0}$ or $LIC_{cand1}$.

In another variant, when looking at the pairwise construction, one can see that there is a bias towards the reference frame of the first input motion candidate, as shown in Table 1 below. LIC aims at compensating the local illumination change between the current frame and the reference frame, it is thus possible to adjust the LIC indicator inheritance for the pairwise motion candidate by considering this bias.

TABLE 1

Pairwise motion candidates reference frame inheritance depending on input motion candidates

| Input cand0 | | Input cand1 | | Pairwise reference frame from cand | |
| --- | --- | --- | --- | --- | --- |
| L0 | L1 | L0 | L1 | L0 | L1 |
| X | X | X | X | 0 | 0 |
| X | X | X | / | 0 | 0 |
| X | X | / | X | 0 | 0 |
| X | / | X | X | 0 | 1 |
| X | / | X | / | 0 | / |
| X | / | / | X | 0 | 1 |
| / | X | X | X | 1 | 0 |
| / | X | X | / | 1 | 0 |
| / | X | / | X | / | 0 |

Table 1 illustrates an example of the reference frame inheritance of the pairwise motion candidates from the input motion candidates (Input cand0, Input cand1). A cross in the cell indicates that the corresponding input motion candidate uses a reference picture from the corresponding reference picture list (L0, L1).

As can be seen in Table 1, when the first input motion candidate is a bi-directional or when both input motion candidates are uni-directional over the same reference frame list (cells with bold text in Table 1), the pairwise motion candidate uses only the reference frame(s) of this first motion candidate. In that case, the value of the LIC indicator for the pairwise motion candidate is set to the value of the LIC indicator of this first input motion candidate.

For all other cases, one of the two variants described above can be used to determine a value for the LIC indicator.

This embodiment can be resumed by:
  If the first input motion candidate is bi-directional or both input motion candidates are uni-directional over the same reference frame list: $LIC_{pairwise}=LIC_{cand0}$,
  Otherwise $LIC_{pairwise}=LIC_{cand0}$ and/or $LIC_{cand1}$.

The same principles can also be applied on HEVC-like combined candidates that pick the List 0 part of one merge candidate combined with the List 1 part of another merge candidate. As well, the same principles can also be applied on STMVP (spatio-temporal motion vector predictor) that averages two spatial and one temporal candidates.

LIC Indicator for Zero Motion Candidates

When constructing a motion candidates list, such as a merge list for example, if there are less than the maximum allowed number of motion candidates in the list, the list is fulfilled with zero motion for which a LIC indictor is set to value indicating that the correction is disabled. Zero motion is added to the motion candidates list as follows:

Zero motion associated with each reference frame of each reference frame list until reaching the minimum number of possible reference frames in each list. For example, if list 0 (L0) contains 4 reference frames and list 1 (L1) only 3, then zero motions are:
  (0, 0) with reference picture 0 of L0+(0, 0) with reference picture 0 of L1, and a LIC indicator disabling correction.
  (0, 0) with reference picture 1 of L0+(0, 0) with reference picture 1 of L1, and a LIC indicator disabling correction.
  (0, 0) with reference picture 2 of L0+(0, 0) with reference picture 2 of L1, and a LIC indicator disabling correction.

Then zero motion associated with the first reference frame of each list until the motion candidates list is fulfilled, are added as follows:
  (0, 0) with reference picture 0 of L0+(0, 0) with reference picture 0 of L1, and a LIC indicator disabling correction.
  (0, 0) with reference picture 0 of L0+(0, 0) with reference picture 0 of L1, and a LIC indicator disabling correction.
. . . .

Such a manner of fulfilling the motion candidates list always disabled correction of the prediction. This impacts the coding efficiency and the usage of the correction tool, and its inheritance mechanism.

According to an embodiment, when constructing a list of motion candidates from at least one spatial neighboring blocks of the block, if a number of the motion candidates in the list is below a maximum allowed number and if the list does not comprise a motion candidate having a zero motion vector and a first value of the indicator, a motion candidate having a zero motion vector and the first value of the indicator is added to the list.

According to a variant, if the number of the motion candidates in the list is below the maximum allowed number and if the list comprises a motion candidate having a zero motion vector and a first value of the indicator, a motion candidate having a zero motion vector and a second value of the indicator is added to the list, the second value of the indicator being different from the first value of the indicator.

In any one of these variants, zero motion vector can be added to the list until the maximum allowed number is reached, each zero motion vector added having a different value of the indicator, or when the indicator can take several values, alternating the value of the indicator associated to the zero motion vector.

According to an embodiment, zero motion over all reference frames are not modified, but as the zero motion with the first reference frame has already been added into the motion candidates list, increasing the diversity of motion candidates in the list is desirable. According to an embodiment, a motion candidate is added to the motion candidates list that has a value of the LIC indicator which is different from the value of a LIC indicator associated to a motion candidate having motion vectors and reference pictures of reference frame list that is already present in the list.

In the example described above, the zero motion with the first reference frame and LIC indicator value disabled has already been added into the motion candidates list, a zero motion with the first reference frame is then added to the list but with a LIC indicator value enabled. According to a variant, when several zero motion are to be added, the LIC indicator value is switched at addition, to keep a diversity in the list.

The zero motion candidates addition in the above example then becomes as follows:

Zero motion associated with each reference frame of each reference frame list:
  (0, 0) with reference picture 0 of L0+(0, 0) with reference picture 0 of L1, and a LIC indicator disabling correction.
  (0, 0) with reference picture 1 of L0+(0, 0) with reference picture 1 of L1, and a LIC indicator disabling correction.
  (0, 0) with reference picture 2 of L0+(0, 0) with reference picture 2 of L1, and a LIC indicator disabling correction.
zero motion associated with first reference frame of each list:
  (0, 0) with reference picture 0 of L0+(0, 0) with reference picture 0 of L1, and a LIC indicator enabling correction.
  (0, 0) with reference picture 0 of L0+(0, 0) with reference picture 0 of L1, and a LIC indicator disabling correction,
  (0, 0) with reference picture 0 of L0+(0, 0) with reference picture 0 of L1, and a LIC indicator enabling correction.
  (0, 0) with reference picture 0 of L0+(0, 0) with reference picture 0 of L1, and a LIC indicator disabling correction,
  . . . .

In a variant, zero motion over all reference frames can be checked if already present in the motion candidates list. If the zero motion candidate is already present, then it is added into the motion candidates list with an opposite LIC indicator value.

For instance, in the example above, a zero motion candidate for reference picture 0 of both lists L0 and L1 is added to the list as follows:
  (0, 0) with reference picture 0 of L0+(0, 0) with reference picture 0 of L1, and a LIC indicator value enabling correction, if a same motion candidate with LIC indicator disabling correction is already present in the list, or
  (0, 0) with reference picture 0 of L0+(0, 0) with reference picture 0 of L1, and a LIC indicator value disabling correction, if a same motion candidate with LIC indicator enabling correction is already present in the list.

According to a variant, the switching process of the LIC indicator value can also be applied when adding zero motion with first reference frame of each list.

LIC Indicator Inheritance for Geometric Motion Candidates

As presented above, the geometric mode combined two non-rectangular partitions. According to a variant, each partition may have an uni-directional motion information picked from a motion candidate list.

As for the pairwise motion candidate, according to an embodiment, in geometric merge mode, the value of the LIC indicator inherited from the motion candidates determined for the partitions is set by applying an "and" or a "or" on the input motion candidates LIC indicator values, as $LIC_{GEO}=LIC_{part0}$ and $LIC_{part1}$, or $LIC_{GEO}=LIC_{part0}$ or $LIC_{part1}$, where $LIC_{GEO}$, $LIC_{part0}$, $LIC_{part1}$ stands for the LIC indicator value of respectively the current block, the first partition and the second partition.

In a variant, as a geometric mode allows having a partition bigger than the other partition, the LIC indicator value for the current block is set to the LIC indicator value of the larger partition. For instance, the size of the partition can be evaluated as a number of pixels in the partition.

Figure 13:
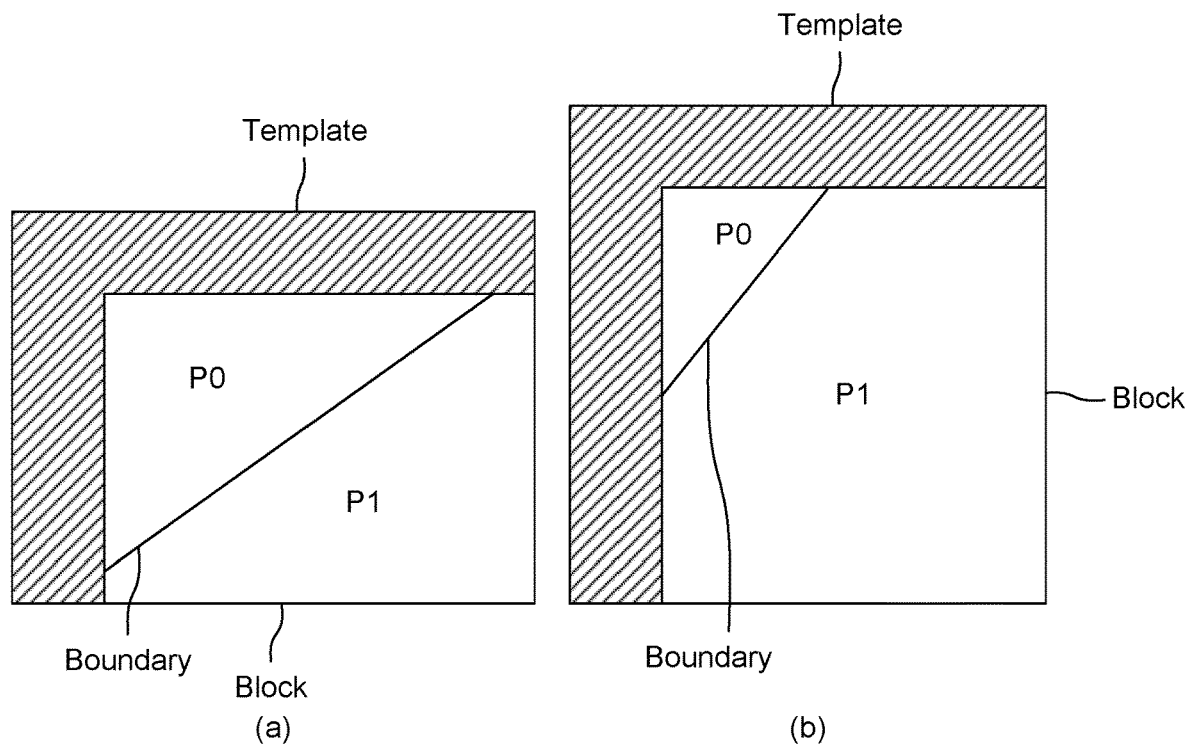
FIG. 13 illustrates an example of geometric partitions having an edge shared with a L-shaped template on top of the block.

FIG. 13 illustrates an example of geometric partitions having an edge shared with a L-shaped template on top of the block which can be used for LIC parameters determination. In FIG. 13(a), partition P0 shares a larger edge with the template than partition P1, while in FIG. 13(b), partition P1 shares a larger edge with the template than partition P0. According to a variant, the LIC indicator value for the current block is set to the LIC indicator value of the partition that shares a larger edge with the template than the other partition. According to this variant, the LIC indicator value is inherited from the partition which shares the greatest neighborhood with the template.

According to variant which can be combined with any one of the variants above, if edges of the partitions shared with the template are equivalent or partitions are equivalent in size, the LIC indicator value can be defined according to a variant that sets the LIC indicator to a value that enables correction when both partitions inherit from a motion candidate having a LIC indicator value enabling correction, or according to a variant that sets the LIC indicator to a value that enables correction when at least one of the partitions inherits from a motion candidate having a LIC indicator value enabling correction.

According to another variant, the amount of neighborhood shared with the template can be compared with a threshold. For instance, if a partition shares more than 90% of its neighborhood with the L-shape border, then the LIC indicator value for the block is set to the LIC indicator value of this partition, otherwise, one of the variants described above is used.

LIC Indicator Inheritance for Constructed Affine Motion Candidates

According to an embodiment, the coding mode that uses motion information of at least two motion candidates is based on an affine model comprising at least two motion candidates determined from spatial or temporal neighbors blocks of the block as described above.

The constructed affine models as presented above are based on motion vectors coming from spatial and temporal neighboring blocks. If the constructed model is a 6-parameter model it uses 3 CPMVs coming from 3 different spatial or temporal neighbors and if it is a 4-parameter model it uses only 2 CPMVs. The considered neighbors, depicted on FIG. 5, are top-left (TL) coming from B2, B3 or A2 positions; top-right (TR) coming from B1 or B0 positions; bottom-left (BL) coming from A1 or A0 positions; and bottom-right (BR) coming from temporal C0 positions.

For each of the possible model, the 3 CPMVs (for 6-param) or 2 CPMVs (for 4-param) corresponding to the TL, TR and if needed BL are derived from the input motion candidates. For example, from the $3^{rd}$ model (TL, BL, BR) it is possible to derive the 3 CPMVs of the constructed model (TL, TR, BL) where TR is defined as TL+BR-BL.

According to a variant, in a similar manner as for the pairwise motion candidate and geometric mode, the LIC indicator value is determined for each model based on the LIC indicator value hold by each input motion candidate involved by applying an "and": $LIC_{model}=LIC_{cand0}$ and $LIC_{cand1}$ and $LIC_{cand2}$, where $LIC_{model}$, $LIC_{cand0}$, $LIC_{cand1}$ and $LIC_{cand2}$ stands for the LIC indicator value of respectively the current block, the first motion candidate, the second motion candidate and the third motion candidate.

According to another variant, when the affine model uses at least three motion candidates, the value of the indicator determined for the prediction indicates that correction of the prediction is enabled in response to a determination that the value of the indicator for at least two of the at least three motion candidates indicates that correction of the prediction is enabled. For instance, in the case of the 6-parameter models which involves 3 input motion candidates, the LIC indicator can thus be determined as $LIC_{model}=(LIC_{cand0}$ and $LIC_{cand1})$ or $(LIC_{cand0}$ and $LIC_{cand2})$ or $(LIC_{cand1}$ and $LIC_{cand2})$.

According to another variant, the temporal BR candidate may not have a LIC indicator value stored in memory, it can be removed from the test which can then be:

If the constructed model comes from a $2^{nd}$, $3^{rd}$ or $4^{th}$ model (where BR is involved), $LIC_{model}=LIC_{cand0}$ and $LIC_{cand1}$, Otherwise $LIC_{model}=LIC_{cand0}$ and $LIC_{cand1}$ and $LIC_{cand2}$.

In another variant, as the top-left CPMV is the most important one as it describes the translational part of the motion, the other CPMVs are describing the rotation and zoom parts of the affine motion, the LIC indicator value for the current block can be set to the value of the LIC indicator of the top-left CPMV motion candidate. If the top-left CPMV motion candidate is not present in the input motion candidates ($4^{th}$ model), then the value of the LIC indicator can be inherited from the top-right motion candidate instead:

If TL is an input candidate $LIC_{model}=LIC_{TL}$.

Otherwise $LIC_{model}=LIC_{TR}$.

In another variant, variants presented above can be combined so that if at least two input motion candidates comprising the first motion candidate have a LIC indicator value enabling correction, then the constructed model inherits from a LIC indicator value enabling correction, as $LIC_{model}=$ $(LIC_{cand0}$ and $LIC_{cand1})$ or $(LIC_{cand0}$ and $LIC_{cand2})$.

LIC Indicator Inheritance for Zero Affine Motion Candidates

As for the motion candidates list construction in the merge mode, if the affine merge list does not contain the maximum number of allowed candidates at the end, the list is fulfilled with zero models associated with the first reference frame.

According to an embodiment, as for the merge mode presented above, zero affine motion candidates are added with a switch between zero models with LIC indicator value enabling and disabling correction. Zero model associated with the first reference frame of each list are added as follows:

{(0, 0) (0, 0) (0, 0)} with reference picture 0 of L0+{(0, 0) (0, 0) (0, 0)} with reference picture 0 of L1+LIC indicator value disabling correction, {(0, 0) (0, 0) (0, 0)} with reference picture 0 of L0+{(0, 0) (0, 0) (0, 0)} with reference picture 0 of L1+LIC indicator value enabling correction, {(0, 0) (0, 0) (0, 0)} with reference picture 0 of L0+{(0, 0) (0, 0) (0, 0)} with reference picture 0 of L1+LIC indicator value disabling correction,

. . . .

In a variant, it is checked if the zero model is already present in the list in order to begin the LIC indicator value switching to the opposite value as the already present one.

Figure 14:
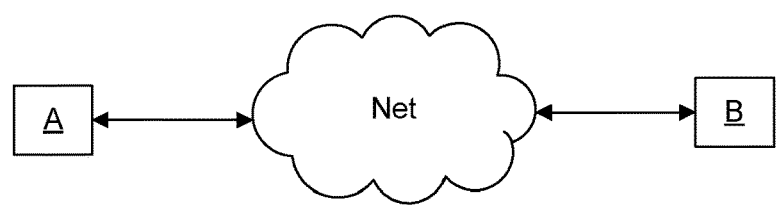
FIG. 14 shows two remote devices communicating over a communication network in accordance with an example of present principles.

According to an example of the present principles, illustrated in FIG. 14, in a transmission context between two remote devices A and B over a communication network NET, the device A comprises a processor in relation with memory RAM and ROM which are configured to implement a method for encoding a video as illustrated in FIG. 1-13 and the device B comprises a processor in relation with memory RAM and ROM which are configured to implement a method for decoding a video as described in relation with FIGS. 1-13.

In accordance with an example, the network is a broadcast network, adapted to broadcast/transmit encoded data representative of a video from device A to decoding devices including the device B.

A signal, intended to be transmitted by the device A, carries at least one bitstream comprising coded data representative of a video. The bitstream may be generated from any embodiments of the present principles.

Figure 15:
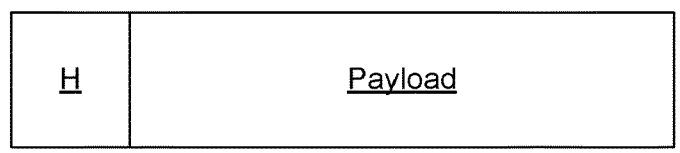
FIG. 15 shows the syntax of a signal in accordance with an example of present principles.

FIG. 15 shows an example of the syntax of such a signal transmitted over a packet-based transmission protocol. Each transmitted packet P comprises a header H and a payload PAYLOAD. According to embodiments, the payload PAYLOAD may comprise coded video data encoded according to any one of the embodiments described above.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the motion compensation, motion estimation, motion refinement modules (270, 272, 275,375, 372), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising encoding at least one block of a video, wherein encoding the block comprises:
   determining a prediction for the block using motion information, wherein motion information is inherited from motion information of at least two motion candidates, the prediction comprising at least two partitions, each partition inheriting motion information from one motion candidate of the at least two motion candidates; and
   encoding the block based on the determined prediction;
   wherein determining the prediction for the block comprises determining a same value of an indicator enabling or disabling local illumination compensation of the prediction for the at least two partitions, the same value of the indicator being determined based on values of corresponding indicators of the at least two motion candidates, wherein the same value of the indicator is determined based on a size of the at least two partitions or on a size of a neighborhood of the at least two partitions within a template used for determining at least one local illumination compensation parameter.

2. An apparatus, comprising one or more processors, wherein the one or more processors are configured to encode at least one block of a video, wherein encoding the block comprises:
   determining a prediction for the block using motion information, wherein motion information is inherited from motion information of at least two motion candidates, the prediction comprising at least two partitions, each partition inheriting motion information from one motion candidate of the at least two motion candidates; and
   encoding the block based on the determined prediction;
   wherein determining the prediction for the block comprises determining a same value of an indicator enabling or disabling local illumination compensation of the prediction for the at least two partitions, the same value of the indicator being determined based on values of corresponding indicators of the at least two motion candidates, wherein the same value of the indicator is determined based on a size of the at least two partitions or on a size of a neighborhood of the at least two partitions within a template used for determining at least one local illumination compensation parameter.

3. A method, comprising decoding at least one block of a video, wherein decoding the block comprises:
   determining a prediction for the block using motion information, wherein motion information is inherited from motion information of at least two motion candidates, the prediction comprising at least two partitions, each partition inheriting motion information from one motion candidate of the at least two motion candidates; and
   decoding the block based on the determined prediction;
   wherein determining the prediction for the block comprises determining a same value of an indicator enabling or disabling local illumination compensation of the prediction for the at least two partitions, the same value of the indicator being determined based on values of corresponding indicators of the at least two motion candidates, wherein the same value of the indicator is determined based on a size of the at least two partitions or on a size of a neighborhood of the at least two partitions within a template used for determining at least one local illumination compensation parameter.

4. An apparatus, comprising one or more processors, wherein the one or more processors are configured to decode at least one block of a video, wherein decoding the block comprises:
   determining a prediction for the block using motion information, wherein motion information is inherited from motion information of at least two motion candidates, the prediction comprising at least two partitions, each partition inheriting motion information from one motion candidate of the at least two motion candidates; and
   decoding the block based on the determined prediction;
   wherein determining the prediction for the block comprises determining a same value of an indicator enabling or disabling local illumination compensation of the prediction for the at least two partitions, the same value of the indicator being determined based on values of corresponding indicators of the at least two motion candidates, wherein the same value of the indicator is determined based on a size of the at least two partitions or on a size of a neighborhood of the at least two partitions within a template used for determining at least one local illumination compensation parameter.

5. The method of claim 3, wherein, responsive to a determination that the value determined for the indicator indicates use of local illumination compensation for the block, determining a prediction for the block comprises determining at least one local illumination compensation parameter and applying local illumination compensation to the prediction.

6. The method of claim 3, wherein the same value of the indicator is the value of the indicator of the motion candidate among the at least two motion candidates from which the largest partition of the prediction inherits motion information.

7. The method of claim 3, wherein the same value of the indicator is the value of the indicator of the motion candidate among the at least two motion candidates which shares a largest neighborhood with a template used for determining at least one local illumination compensation parameter.

8. The method of claim 3, wherein determining the prediction for the block comprises constructing a list of motion candidates from at least one spatial neighboring blocks of the block, and wherein responsive to a determination that a number of the motion candidates in the list is below a number and to a determination that the list does not comprise a motion candidate having a zero motion vector and a first value of the indicator, adding in the list a motion candidate having a zero motion vector and the first value of the indicator, or responsive to a determination that the number of the motion candidates in the list is below the number and to a determination that the list comprises a motion candidate having a zero motion vector and the first value of the indicator, adding in the list a motion candidate having a zero motion vector and a second value of the indicator, the second value of the indicator being different from the first value of the indicator.

9. A non-transitory computer readable storage medium having stored thereon instructions for causing one or more processors to perform the method of claim 3.

10. The method of claim 1, wherein the same value of the indicator is determined based on an amount of the neighborhood shared with the template.

11. The apparatus of claim 4, wherein the same value of the indicator is the value of the indicator of the motion candidate among the at least two motion candidates from which the largest partition of the prediction inherits motion information.

12. The apparatus of claim 4, wherein the same value of the indicator is determined based on an amount of the neighborhood shared with the template.

13. The apparatus of claim 2, wherein the same value of the indicator is the value of the indicator of the motion candidate among the at least two motion candidates from which the largest partition of the prediction inherits motion information.

14. The method of claim 1, wherein the same value of the indicator is the value of the indicator of the motion candidate among the at least two motion candidates from which the largest partition of the prediction inherits motion information.

15. The method of claim 1, wherein the same value of the indicator is the value of the indicator of the motion candidate among the at least two motion candidates which shares a largest neighborhood with a template used for determining at least one local illumination compensation parameter.

16. A non-transitory computer readable storage medium having stored thereon instructions for causing one or more processors to perform the method of claim 1.

17. The apparatus of claim 2, wherein the same value of the indicator is determined based on an amount of the neighborhood shared with the template.

18. The apparatus of claim 2, wherein the same value of the indicator is the value of the indicator of the motion candidate among the at least two motion candidates which shares a largest neighborhood with a template used for determining at least one local illumination compensation parameter.

19. The method of claim 3, wherein the same value of the indicator is determined based on an amount of the neighborhood shared with the template.

20. The apparatus of claim 4, wherein the same value of the indicator is the value of the indicator of the motion candidate among the at least two motion candidates which shares a largest neighborhood with a template used for determining at least one local illumination compensation parameter.

\* \* \* \* \*